H. HILENBRANT.
COMBINED PROVING AND BAKING OVEN.
APPLICATION FILED JULY 9, 1920.
1,420,102.
Patented June 20, 1922.
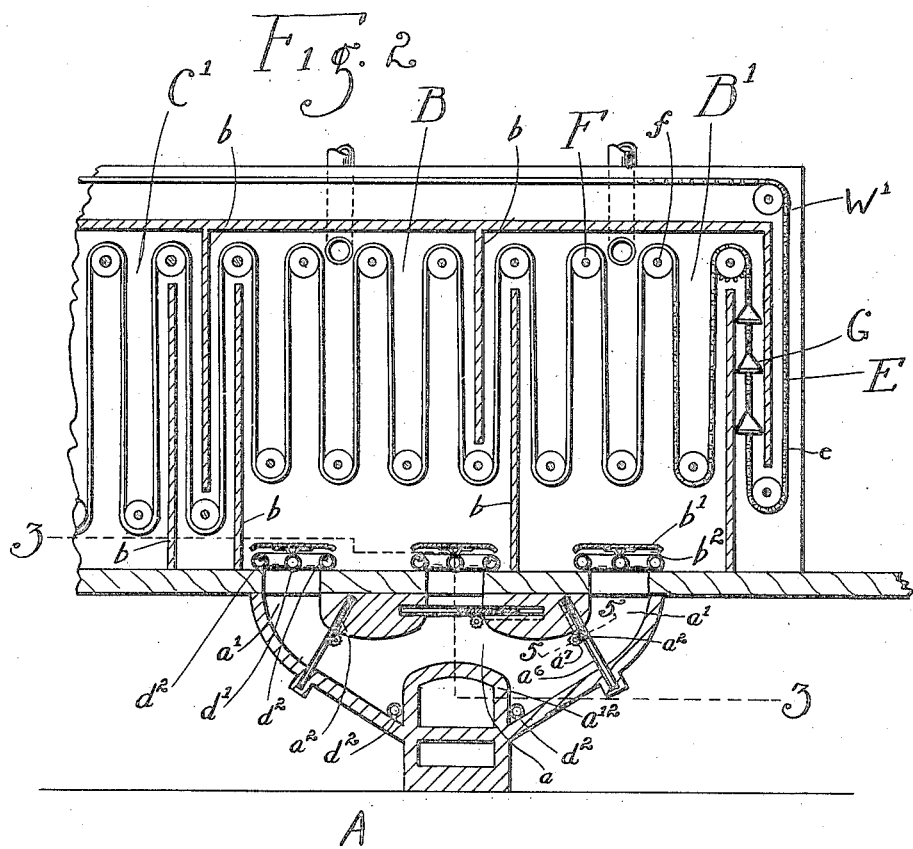
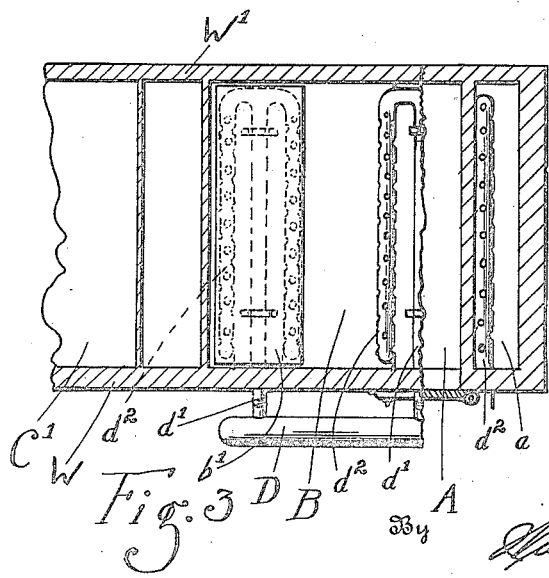
Inventor
Harry Hilenbrant
By
Walter H. Murray
Attorney

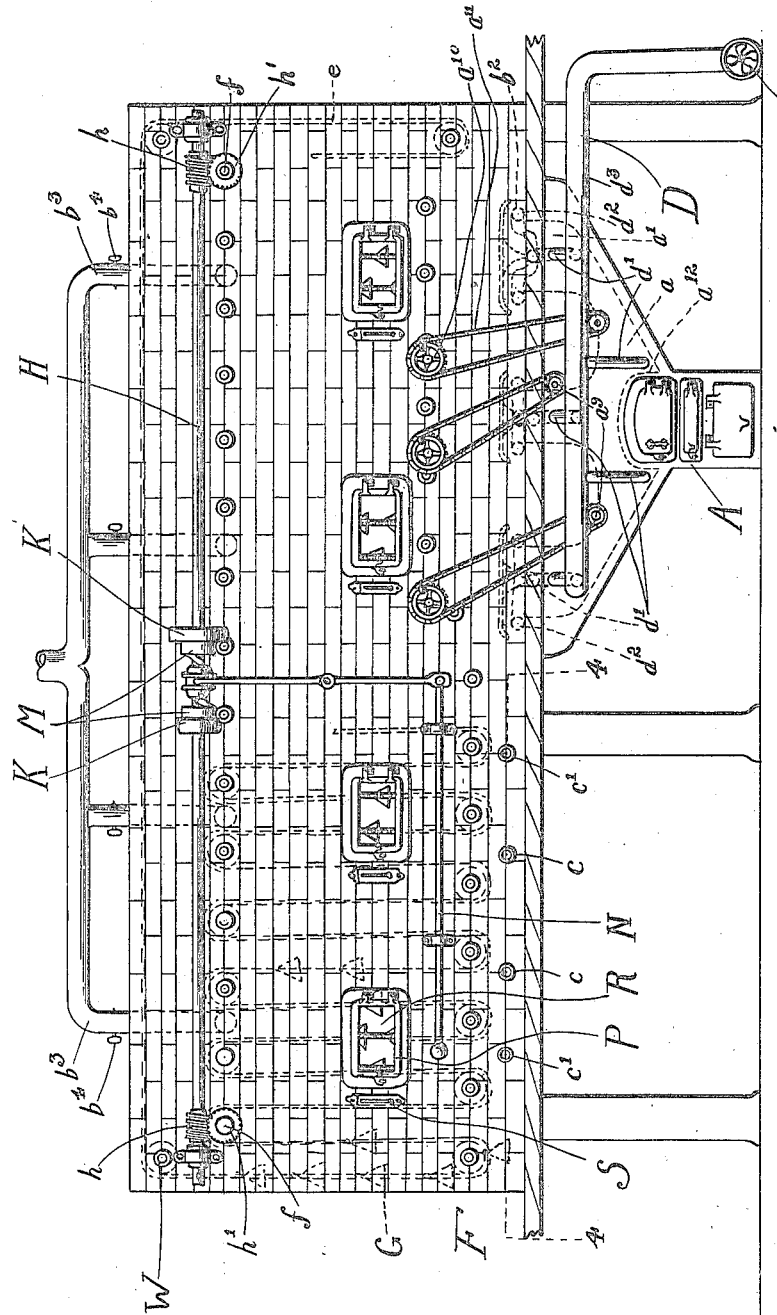

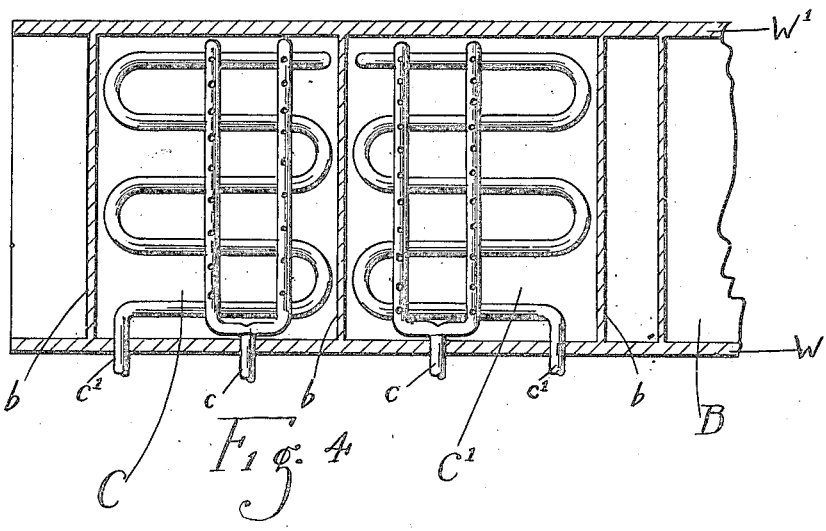
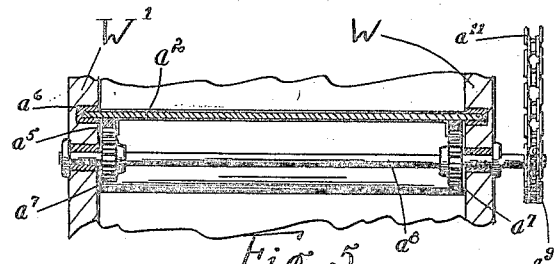
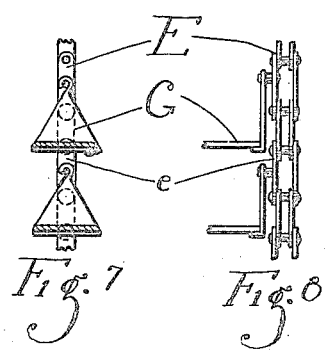
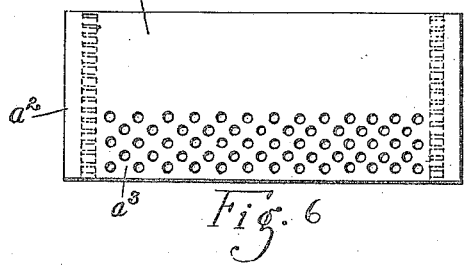

UNITED STATES PATENT OFFICE.

HARRY HILENBRANT, OF CINCINNATI, OHIO.

COMBINED PROVING AND BAKING OVEN.

1,420,102.
Specification of Letters Patent.
Patented June 20, 1922.

Application filed July 9, 1920. Serial No. 394,973.

*To all whom it may concern:*

Be it known that I, HARRY HILENBRANT, a citizen of the United States of America, and resident of Cincinnati, in the county of Hamilton and State of Ohio, have invented a new and useful Improvement in Combined Proving and Baking Ovens, of which the following is a specification.

An object of my invention is to provide a combined proving and baking oven that requires a compratively small space for its operation, in relation to its production capacity.

Another object is to provide an oven in which there will be uniformity of baking regardless of quantity baked.

Another object is to provide a device in which the substance to be baked can be easily kept under the immediate supervision of one man, while raising or baking.

Another object is to provide a proving oven wherein the humidity and the temperature may be modified at will.

Another object is to provide an oven that will use direct heat thereby saving fuel and time in heating the oven.

Another object is to keep the air in the oven in constant circulation thereby keeping the temperature uniform and constant throughout the entire chamber.

These and other objects are attained by the means described herein and disclosed in the accompanying drawing in which:

Fig. 1 is a front elevation of an oven embodying my invention.

Fig. 2 is a fragmental sectional elevation of the device shown in Fig. 1, the front being removed.

Fig. 3 is a sectional view on line 3—3 of Fig. 2.

Fig. 4 is a sectional view on line 4—4 of Fig. 1.

Fig. 5 is an enlarged sectional view on line 5—5 of Fig. 2.

Fig. 6 is a plan view of a feed damper shown in Fig. 5, and forming a detail of my invention.

Fig. 7 is an enlarged fragmental view of a conveyor forming a detail of my invention.

Fig. 8 is an end view of the parts shown in Fig. 7.

My invention comprises a furnace A having a heating chamber $a$ about it. The chamber $a$ communicates with the bake ovens B and B′ through which an endless conveyer E carries the baking substances. The air in the heating chamber and the ovens is kept in constant circulation through a forced draft system D. The proving or raising chambers C and C′ adjoin the bake ovens and are traversed by the conveyer E.

The furnace A may be of any type or kind. A chamber $a$ is constructed immediately adjacent to the furnace, so that the heat generated in the furnace is directly applied to the air in this chamber. A series of ducts $a'$ direct the air immediately from chamber $a$ to the baking section or ovens B and B′. The majority of ducts lead to the oven B, the reason therefor will be explained hereafter. A series of feed dampers $a^2$ are mounted in the ducts. The dampers have a perforated section $a^3$ and an imperforate section $a^4$, either section being large enough to extend completely across any duct. Racks $a^5$ are formed on the dampers whereby the dampers may be reciprocated in the ways $a^6$, formed in the walls of the ducts, by means of the gear wheels $a^7$ mounted on shaft $a^8$. The gear wheels are operated by means of the sprocket wheels $a^9$ mounted on the shaft $a^8$ and connected with the hand wheel $a^{10}$ by means of the chain $a''$. The hand wheels $a^{10}$ are revolubly mounted on the front of the baking ovens B and B′.

The ovens B and B′ are built substantially alike. The ovens are enclosed and separated from one another by means of a series of vertically parallel partitions $b$ spaced alternately from the bottom and top of the ovens and at such distance that the trays F can pass between the partitions; the trays substantially sealing the space between the partitions. The ducts $a'$ communicate with the ovens. Deflectors $b'$ are mounted upon the pipe $d'$, and extend over the tops of the ducts leaving a passage $b^2$ between the deflector and bottom of the oven. An exhaust pipe $b^3$ extends from each baking section and proving section, and an exhaust damper $b^4$ is mounted in such pipes.

The proving chambers C and C′ are enclosed and separated from one another and from the baking ovens B and B′ by partitions $b$. Perforated steam pipes $c$ and imperforate pipes $c'$ extend into each of the proving chambers. Live steam is introduced into the chambers through the perforated pipes $c$ and dry heat is applied to the chambers by means of the pipes $c'$.

The forced air draft system D comprises the fan $d$, supply pipe $d^3$, the lead pipes $d'$, and the perforated draft pipes $d^2$. The perforated pipes $d^2$ are all disposed within the heating chamber $a$ and within the baking sections B and B'. The lead pipes $d'$ connect the supply pipe and the perforated pipes $d^2$, the feed pipes in the ovens traversing the width of the baking oven before they communicate with the perforated pipes. This gives the air that is forced through the draft system, an opportunity to become heated before being discharged from the perforated pipes. Some of the perforated pipes $d^2$ are disposed immediately adjacent to the wall $a^{12}$ of the furnace. Other of the perforated pipes $d^2$ extend along the deflectors $b'$ and in the passages $b^2$. The forced air draft is sufficient to keep the air in the heating chamber and in the baking ovens in constant circulation, but does not create any violent movement of the air therein. The lead pipes, directing the draft to the perforated pipes placed in the passages $b^2$, as they traverse the ovens, serve as supports upon which the deflectors $b'$ are mounted.

The conveyer system comprises the endless chains $e$ passing through the proving chambers C and C' and the baking ovens B and B', and extending over the top of the oven. The chains pass over a series of sprocket wheels F disposed along its path. The shafts $f$ upon which the sprocket wheels are mounted are supported by the front wall W and rear wall W' of the oven. The sprocket wheels inside the proving chambers and ovens are arranged in staggered relation, alternately near the top and bottom of the chambers and ovens, so trays G will be repeatedly moved up and down in the same chamber or oven in their passage through the proving chambers and ovens. This alternate up and downward movement is parallel to the partitions $b$, the trays G thereby passing between the adjoining partitions as they enter or leave any chamber or oven. The substance to be baked is placed on the tray as the tray is about to enter proving chamber C, the baked substance being removed from the tray when emerging from baking oven B'. Passing the conveyer over the oven reduces the temperature of the conveyer to that of the bake shop, consequently to the temperature of the substance to be baked.

The drive shaft H has the worm gears $h$ mounted thereon, the worms engaging with the worm wheels $h'$ mounted on the shafts $f$ upon which the sprocket wheels F are fixedly mounted.

The drive shaft may be actuated by any suitable means, such as the pulleys K. The pulleys K are loosely mounted upon the shaft and are of different sizes, whereby different speeds of the conveyors may be obtained.

The clutch M is used to transmit the motion of either pulley to shaft H, thereby varying the speed with which the substances to be baked are passed through the ovens. The number of these pulleys and clutches may be modified, whereby the speed of the conveyer can be regulated in accordance with the individual requirements of the things to be baked.

The clutches are manipulated by the lever N mounted on the front of the oven.

Doors P having glass windows R therein, communicate with the chambers and ovens and permit constant supervision of the substances while raising and baking.

The thermometers S register the temperatures within the chambers and ovens.

The proving chambers and ovens are all on the same main floor. The furnace is preferably in the basement or floor below.

The feed dampers, the exhaust dampers, and the speed of the conveyer are controlled from the main floor, whereby a minimum number of operators can keep the substance under their immediate supervision and control at all times.

The operation of my device is as follows:

The drive shaft H actuates the conveyer system E.

The articles to be baked are placed on the trays G as they enter the proving chamber C. The temperatures and humidity of chamber C, and C' are raised or lowered by means of the heat radiating from the pipes $c'$, the perforated pipes $c$, the exhaust pipes $b^3$ and exhaust dampers $b^4$. The development of the substance in the proving chambers is readily observed through the glass doors, moderation in the chambers being made by the before mentioned means. The adjoining proving rooms are independent of one another in that conditions within either can be modified without affecting the other. Any excess or insufficient raising in the first chamber can be compensated in the second chamber. The conveyer system then carries the trays and substances thereon into the oven B. The oven B is heated by the direct heat of the furnace A. The gentle air draft passing through the forced draft system D, eliminates pockets of air in both the heating chamber $a$ and in the ovens B and B', assuring a uniform temperature throughout the ovens. The heat within the ovens is controlled by the feed dampers $a^2$ and the exhaust dampers $b^4$. The feed dampers are moved in or out of the pockets or ways $a^6$ by means of the hand wheels $a^{10}$, sprocket wheels $a^9$, chains $a''$ extending around the hand wheels and sprocket wheels, and the gear $a^7$, mounted on shaft $a^8$ to which the sprocket wheel is attached, gear $a^7$ engaging the rack on the damper. The dampers are moved to close off part of the ducts a' to regulate the communication between heating chamber a and the baking ovens, thereby regulating the flow of hot air to the ovens. The conveyer movement is so regulated that the substance is properly raised when it is carried into the baking ovens, and is properly baked when carried out of the ovens. This movement is controlled by the shaft H and the pulleys K, clutches M and hand lever N. When the baked substance has been carried from the oven B' it is removed from the tray. The tray is then carried over the top of the device to the proving chamber. The trays cool off as they pass to the proving chamber, or the place where more of the substance is placed on the trays.

It is one of the principles of proper and scientific baking, that baking substances must first be subjected to a certain temperature. After exposure to such temperature for a given time or until certain reactions have taken place within the substance, the substances should be subjected to a different temperature, some substances requiring a high and then a lower second temperature and for this reason I have shown two ducts a' leading to oven B and one duct to oven B'. For example, bread should first be subjected to a high degree of temperature and then to a lower temperature. Various substances demand various changes. For this reason a number of independent adjoining ovens are necessary. The same requirements to a more limited extent, are essential to the proving process, therefore a series of adjoining proving ovens are required.

By placing the proving chambers, baking ovens, and the various controlling means on the same floor it is possible for a minimum number of operators to keep the device under their immediate supervision and care.

What I claim is:

1. In a baking oven the combination with a series of independent baking ovens adjoining one another, of a series of proving chambers adjoining one of the baking ovens, partitions separating the ovens and proving chambers and means for carrying articles traveling through the proving chambers, through the baking ovens, and between the partitions.

2. In a baking oven the combination with a series of baking ovens adjoining one another in horizontal alignment, of a series of proving chambers adjoining one of the baking ovens, the proving sections being in horizontal alignment with the baking ovens, partitions separating the ovens and the proving chambers and means for carrying articles traveling through the series of proving chambers, through the baking ovens, and between adjacent partitions.

3. In a baking oven the combination with a series of independent and communicating baking ovens, of a furnace below the baking ovens, a heating chamber about the furnace, a series of ducts leading from the heating chamber to the baking ovens, dampers in the ducts, a series of perforated pipes in the heating chamber, a series of perforated pipes in the baking ovens, lead pipes connected with the perforated pipes, and a fan adapted to force a current of air through the pipes.

4. In a baking oven the combination with a series of baking ovens, of a furnace, a heating chamber about the furnace, ducts leading from the heating chamber to the baking ovens, deflectors in the baking ovens and extending over the ducts, perforated pipes in the heating chamber, perforated pipes in the baking ovens, a fan, lead pipes adapted to convey an air draft from the fan to the perforated pipes, and means for carrying articles traveling through the baking ovens.

5. In a baking oven the combination with a baking oven, of a furnace, and a forced draft system comprising a supply pipe parallel with and adjoining the front of the oven, a series of feed pipes communicating with the supply pipe and entering the oven and traversing the bottom of the oven, a series of perforated pipes communicating with the feed pipes and deflectors mounted upon the feed pipes interiorly to the baking oven and extending over the perforated pipes.

6. In a baking oven the combination with a series of adjoining and communicating baking ovens, of a furnace below the ovens, a heating chamber about the furnace, a series of ducts leading from the heating chamber to one of the baking ovens, a lesser number of ducts leading from the heating chamber to a second baking chamber, dampers in the ducts adapted to regulate communication between the heating chamber and the baking ovens, and means for carrying articles traveling through the baking ovens.

7. In a baking oven the combination with a series of independent and communicating proving chambers, of a series of independent and communicating baking ovens adjacent to one of the proving chambers and communicating with said adjacent proving chamber, means to vary the temperature and humidity of the individual proving chambers, a furnace adapted to directly heat the baking ovens, means to circulate the air in the baking ovens, and means for carrying articles traveling through the proving chambers and through the baking ovens.

8. In a baking oven the combination with a series of independent and communicating proving chambers, of a series of independent and communicating baking ovens adjacent to one of the proving chambers and communicating with said adjacent proving chamber, said ovens and chambers being in horizontal alignment, observation doors for each chamber and oven, a furnace below the baking ovens adapted to heat the ovens directly, means to heat the chambers, exhaust pipes communicating with each chamber and oven, exhaust dampers in the exhaust pipes, a series of sprocket wheels within the proving chambers and in the baking ovens, the sprocket wheels being alternately spaced at the top and bottom of the chambers and ovens, a series of sprocket wheels outside of the chambers and ovens, endless conveyer chains passing over the sprocket wheels, a series of trays attached to the conveyer chains, a drive shaft adapted to actuate the conveyer chains and sprocket wheels, means to vary the speed of the drive shaft, and means to circulate the air within the baking ovens.

In witness whereof, I have hereunto subscribed my name this 25th day of June, 1920.

HARRY HILENBRANT.